United States Patent
Cadours et al.

(10) Patent No.: US 7,459,134 B2
(45) Date of Patent: Dec. 2, 2008

(54) METHOD OF DECARBONATING A COMBUSTION FUME WITH EXTRACTION OF THE SOLVENT CONTAINED IN THE PURIFIED FUME

(75) Inventors: Renaud Cadours, Francheville (FR); Fabrice Lecomte, Paris (FR); Lionel Magna, Lyons (FR); Cécile Barrere-Tricca, Soucieu en Jarrest (FR)

(73) Assignee: Institut Francais du Petrole

( * ) Notice: Subject to any disclaimer, the term of this patent is extended or adjusted under 35 U.S.C. 154(b) by 385 days.

(21) Appl. No.: 11/336,888

(22) Filed: Jan. 23, 2006

(65) Prior Publication Data

US 2006/0188423 A1 Aug. 24, 2006

(30) Foreign Application Priority Data

Jan. 28, 2005 (FR) ................... 05 00923

(51) Int. Cl.
*B01D 53/50* (2006.01)
*B01D 53/56* (2006.01)
*B01D 53/62* (2006.01)
*B01D 53/78* (2006.01)

(52) U.S. Cl. ............. 423/210; 423/220; 423/226; 423/228; 423/235; 423/242.1; 423/242.2; 423/242.4; 423/243.01; 423/243.08; 423/246

(58) Field of Classification Search ......... 423/210, 423/220, 226, 228, 235, 242.1, 242.2, 242.4, 423/243.01, 243.08, 246
See application file for complete search history.

(56) References Cited

U.S. PATENT DOCUMENTS

| 7,304,200 B2 * | 12/2007 | Roettger et al. .......... 585/833 |
| 2002/0104438 A1 | 8/2002 | Cadours et al. |
| 2002/0189444 A1 | 12/2002 | Brennecke et al. |
| 2005/0169825 A1 * | 8/2005 | Cadours et al. .......... 423/220 |

FOREIGN PATENT DOCUMENTS

| FR | 2 840 917 | 12/2003 |
| WO | WO 03/086605 A2 | 10/2003 |
| WO | WO 03/086605 A3 | 10/2003 |

OTHER PUBLICATIONS

International Search Report for FR 0500923/FA 661610, dated Sep. 16, 2005.

* cited by examiner

*Primary Examiner*—Timothy C Vanoy
(74) *Attorney, Agent, or Firm*—Antonelli, Terry, Stout & Kraus, LLP.

(57) ABSTRACT

The combustion fume flowing in through line 1 is decarbonated by contacting with a solvent in column C2. The solvent laden with carbon dioxide is regenerated in zone R. The purified fume discharged through line 9 comprises part of the solvent. The method allows to extract the solvent contained in the purified fume. The purified fume is contacted in zone ZA with a non-aqueous ionic liquid of general formula $Q^+A^-$; $Q^+$ designates an ammonium, phosphonium and/or sulfonium cation, and $A^-$ an anion likely to form a liquid salt. The solvent-depleted purified fume is discharged through line 17. The solvent-laden ionic liquid is regenerated by heating in evaporation device DE. The solvent separated from the ionic liquid in device DE is recycled.

15 Claims, 1 Drawing Sheet

METHOD OF DECARBONATING A COMBUSTION FUME WITH EXTRACTION OF THE SOLVENT CONTAINED IN THE PURIFIED FUME

FIELD OF THE INVENTION

The present invention relates to the sphere of combustion fumes treatment. More precisely, the present invention aims to associate a method of extracting the solvent contained in the purified fume after a decarbonation treatment.

BACKGROUND OF THE INVENTION

Atmospheric pollution is a phenomenon which gains in importance, as regards the sources of emission of the polluting compounds emitted as well as the impact of the pollution on man and on the environment. Carbon dioxide ($CO_2$) is one of the greenhouse effect gases widely produced by man's various activities, notably by the combustion of fossil energies such as coal, natural gas and petroleum derivatives.

In order to reduce the amounts of greenhouse effect gases discharged to the atmosphere, it is possible to capture the carbon dioxide contained in industrial fumes, which are large stationary sources.

The composition of a fume corresponds, by volume, to about 75% nitrogen ($N_2$), 15% carbon dioxide ($CO_2$), 5% oxygen ($O_2$) and 5% water ($H_2O$). Various impurities such as sulfur oxides (SOx), nitrogen oxides (NOx), argon (Ar) and other particles are also present, in lower proportions, generally representing less than 2% by volume of the fumes. Typically, the composition in percent by volume of the fumes obtained by combustion of a natural gas can be: 2.5% $O_2$, 71.6% $N_2$, 0.6% Ar, 8.5% $CO_2$, 16.3% $H_2O$, 0.2% CO, and unburned compounds. Typically, the composition in percent by volume of the fumes obtained by combustion of coke can be: 5.7% $O_2$, 75.2% $N_2$, 1.0% Ar, 13.3% $CO_2$, 4.8% $H_2O$. These fumes are generally discharged to the atmosphere at a temperature ranging between 50° C. and 180° C., and at a pressure generally below 2 MPa.

In general, decarbonation and deacidizing of the fumes are carried out by washing the fumes with a solvent.

In order to remove 90% of the carbon dioxide contained in the fume, a solvent combining a great physical affinity or a great chemical affinity with the carbon dioxide to be absorbed is often used. Using a solvent consisting of water, alkanolamine or amine or of another basic compound, and an organic compound such as an alcohol, sulfolane or any other organic molecule with a high polar character allows to combine a high absorption capacity and a great chemical affinity between the solvent and the acid gases to be eliminated.

For example, a decarbonation method using washing with a solvent is described in the document entitled "Research Results for $CO_2$ Capture from Flue Gas by Aqueous Absorption/Stripping", by Rochelle, G. T.; Goff, G. S.; Cullimane, J. T.; Freguia, S.; presented at the Laurance Reid Gas Conditioning Conference, Feb. 25-27, 2002. Absorption of the carbon dioxide is achieved at temperatures ranging between 40° C. and 80° C.

These methods are however penalized by the solvent losses due to the solvent saturation of the fumes treated and to the solvent being mechanically carried along in the fumes. These losses are all the higher since the solvent constituents have a high vapour pressure.

SUMMARY OF THE INVENTION

The present invention thus proposes a technique for recovering the volatile constituents of a solvent carried along in the fumes from a decarbonation or deacidizing plant.

In general terms, the invention relates to a method of treating a combustion fume comprising acid compounds such as carbon oxides, nitrogen oxides and sulfur oxides, wherein the following stages are carried out:

a) contacting the fume with a solvent capturing the acid compounds so as to obtain, on the one hand, a solvent-comprising purified fume and, on the other hand, a solvent laden with acid compounds, and b) contacting the purified fume obtained in stage a) with a non-aqueous ionic liquid so as to obtain a solvent-depleted purified fume and a solvent-laden ionic liquid, the ionic liquid having as general formula $Q^+ A^-$; $Q^+$ designating an ammonium, phosphonium and/or sulfonium cation, and $A^-$ an anion likely to form a liquid salt.

According to the invention, the following stage can also be carried out:

c) regenerating the solvent-laden ionic liquid so as to recover, on the one hand, a solvent-depleted ionic liquid and, on the other hand, a solvent-comprising effluent.

According to the invention, in stage c), the solvent-laden ionic liquid can be heated to evaporate the solvent-comprising effluent.

Prior to stage a), the fume can be contacted with the effluent obtained in stage c).

The solvent laden with acid compounds, obtained in stage a), can be regenerated by expansion and/or heating.

The solvent can comprise at least one compound selected from among glycols, ethers, glycol ethers, alcohols, sulfolane, N-methylpyrrolidone, propylene carbonate, ionic liquids, amines, alkanolamines, amino-acids, amides, ureas, phosphates, carbonates and alkali metal borates. The solvent can furthermore be in aqueous solution.

Anion $A^-$ can be selected from the groups comprising the following ions: halogenides, nitrate, sulfate, phosphate, acetate, halogenoacetates, tetrafluoroborate, tetrachloroborate, hexafluorophosphate, hexafluoroantimonate, fluorosulfonate, alkylsulfonates, perfluoroalkylsulfonates, bis(perfluoroalkylsulfonyl) amidides, tris-trifluoromethanesulfonyl methylide of formula $C(CF_3SO_2)_3^-$, alkylsulfates, arenesulfates, arenesulfonates, tetraalkylborates, tetraphenylborate and tetraphenylborates whose aromatic rings are substituted.

Cation $Q^+$ can have one of the general formulas as follows: $[NR^1R^2R^3R^4]^+$, $[PR^1R^2R^3R^4]^+$, $[R^1R^2N=CR^3R^4]^+$ and $[R^1R^2P=CR^3R^4]^+$ where $R^1$, $R^2$, $R^3$ and $R^4$, identical or different, represent hydrogen or a hydrocarbyl having 1 to 30 carbon atoms, except for cation $NH_4^+$ for $[NR^1R^2R^3R^4]^+$.

Cation $Q^+$ can derive from a nitrogen and/or phosphorus heterocycle comprising 1, 2 or 3 nitrogen and/or phosphorus atoms, the heterocycle consisting of 4 to 10 carbon atoms.

Cation $Q^+$ can also have one of the general formulas as follows: $R^1R^2N^+=CR^3-R^5-R^3C=N^+R^1R^2$ and $R^1R^2P^+=CR^3-R^5-R^3C=P^+R^1R^2$, where $R^1$, $R^2$ et $R^3$ represent hydrogen or a hydrocarbyl remainder having 1 to 30 carbon atoms and where $R^5$ represents an alkylene or phenylene remainder.

Cation $Q^+$ can also be selected from the group comprising N-butylpyridinium, N-ethylpyridinium, pyridinium, ethyl-3-methyl-1-imidazolium, butyl-3-methyl-1-imidazolium, hexyl-3-methyl-1-imidazolium, butyl-3-dimethyl-1,2-imidazolium, diethyl-pyrazolium, N-butyl-N-methylpyrrolidinium, trimethylphenyl-ammonium, tetrabutylphosphonium, tributyl-tetradecyl-phosphonium.

Cation $Q^+$ can also be of general formula $[SR^1R^2R^3]^+$, where $R^1$, $R^2$ and $R^3$, identical or different, represent each a hydrocarbyl remainder having 1 to 12 carbon atoms.

The ionic liquid can be selected from the group comprising N-butyl-pyridinium hexafluorophosphate, N-ethyl-pyridinium tetrafluoroborate, pyridinium fluorosulfonate, butyl-3-methyl-1-imidazolium tetrafluoroborate, butyl-3-methyl-1-imidazolium bis-trifluoromethane-sulfonyl amidide, triethylsulfonium bis-trifluoromethane-sulfonyl amidide, butyl-3-methyl-1-imidazolium hexafluoro-antimonate, butyl-3-methyl-1-imidazolium hexafluorophosphate, butyl-3-methyl-1-imidazolium trifluoroacetate, butyl-3-methyl-1-imidazolium trifluoromethylsulfonate, butyl-3-methyl-1-imidazolium bis(trifluoromethylsulfonyl)amidide, trimethylphenylammonium hexafluorophosphate, tetrabutylphosphonium tetrafluoroborate.

Advantageously, the method according to the invention allows to recover the volatile compounds of the solvent carried along by the decarbonated fume. The solvent is recovered at a high level of purity, and this level can be compatible with recycling to the process.

BRIEF DESCRIPTION OF THE FIGURES

Other features and advantages of the invention will be clear from reading the description hereafter, with reference to FIG. 1 which diagrammatically shows the method according to the invention and to FIG. 2 which shows an improvement brought to the invention.

DETAILED DESCRIPTION

Figures 1, 2:
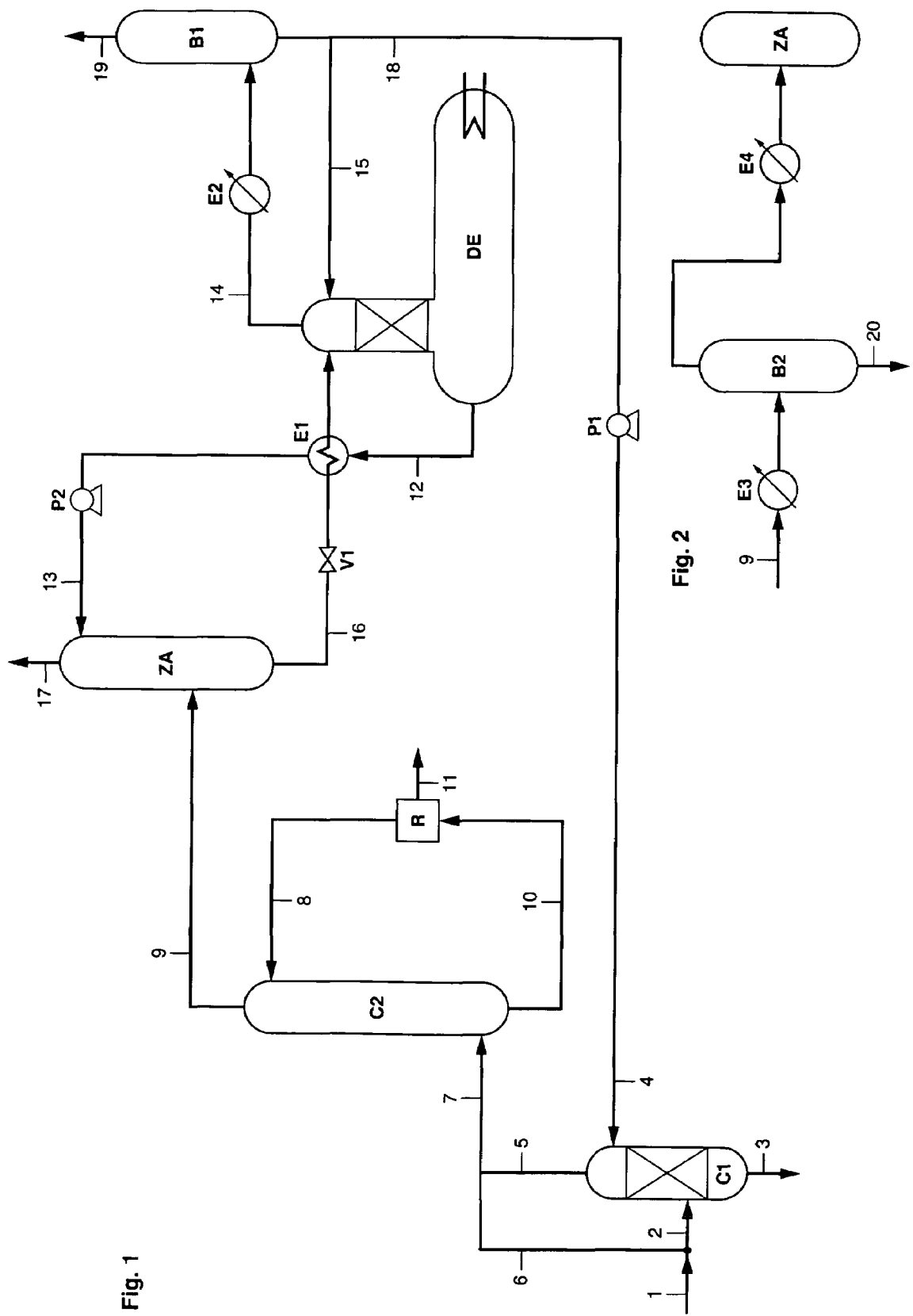

In FIG. 1, the fume to be treated flows in through line 1. For example, the fume resulting from the combustion of natural gas, of fuel oil or of coal contains 50% to 80% nitrogen, 5% to 20% $CO_2$, 2% to 10% $O_2$, and various impurities such as sulfur oxides (SOx), nitrogen oxides (NOx), dusts or other particles. The fume can be available at a pressure ranging between 1 and 100 bars, preferably ranging between 1 and 5 bars, and at a temperature ranging between 20° C. and 300° C., preferably between 40° C. and 180° C. Furthermore, the fume can be saturated with water. The temperature and the pressure of the gas mixture can be controlled in order to correspond to the ideal operating conditions of column C2. For example, the fume flowing in through line 1 is subjected to compression and/or cooling. A separator drum can be used to separate a possibly condensed fraction.

A fraction of the fume can be fed through line 2 into contacting zone C1, where it is contacted with a solvent-containing aqueous solution flowing in through line 4. At the bottom of column C1, an aqueous phase is discharged through line 3. At the top of column C1, a solvent-laden fume that can be mixed with a second fraction of the fume to be treated, flowing in through line 6, is discharged through line 5.

This gas mixture is sent through line 7 to column C2 where it is contacted with a solvent flowing in through line 8. In column C2, the solvent absorbs the acid compounds contained in the fume.

The solvents used in the present invention are absorption solutions comprising one or more organic solvents and/or one or more compounds having the capacity to reversibly react with the acid gases ($CO_2$, $NO_x$, $SO_x$) contained in the fumes. The functions reacting with the acid gases can also be grafted on the solvent(s). The solution used can contain water. The solvents can be glycols, glycol ethers, alcohols, sulfolane, N-methylpyrrolidone, propylene carbonate or ionic liquids. The reactive compounds can be amines (primary, secondary, tertiary, cyclic or not, aromatic or not), alkanolamines, amino-acids, amides, ureas, phosphates, carbonates or alkali metal borates. The solution can furthermore contain anticorrosion and/or antifoaming additives and/or a kinetic activator.

The purified fume, i.e. depleted in acid compounds, is discharged from column C2 through line 9. This purified fume comprises nitrogen, possibly water and part of the solvent which it was contacted with. In fact, upon contacting in C2, the nitrogen co-absorbs and carries along solvent and possibly water.

The solvent laden with acid compounds is discharged from column C2 through line 10, then it is fed into regeneration zone R. Zone R allows to separate the acid compounds from the solvent.

Zone R can carry out a succession of expansions of the aqueous solution and/or of temperature increases, for example by distillation, of the solvent. Expansion and temperature increase allow to release, in form of a gaseous effluent, the carbon dioxide and other acid compounds absorbed by the solvent. Upon regeneration, a proportion of solvent is also vaporized and carried along with the acid compounds. Thus, the gaseous effluent discharged from zone R through line 11 comprises, on the one hand, acid compounds, in proportions ranging for example between 70% and 99% and, on the other hand, solvent in proportions that can range between some ppm and 20%. Furthermore, the gaseous effluent can possibly comprise water. The regenerated solvent, i.e. depleted in acid compounds, obtained after expansion and/or distillation is discharged from zone R through line 8 and can be fed into column C2.

The purified fume containing solvent and possibly water, circulating in line 9, is fed into absorption zone ZA where it is contacted with a non-aqueous ionic liquid flowing in through line 13. In zone ZA, the solvent and possibly the water contained in the fume flowing in through line 9 are absorbed by the ionic liquid. The fume depleted in solvent and possibly in water, i.e. containing essentially nitrogen, is discharged from zone ZA through line 17. Thus, if the purified fume comprises water, the method according to the present invention also has the advantage of dehydrating this fume. The ionic liquid laden with solvent and water is discharged from zone ZA through line 16. Contacting in zone ZA can be carried out under pressure, for example between 1 MPa and 10 MPa, and at a temperature ranging between 20° C. and 100° C., preferably between 40° C. and 90° C.

Contacting in zone ZA can be carried out in one or more cocurrent or countercurrent washing columns, for example in columns of perforated, bubble-cap or valve tray type, or in random or stacked packing type columns. It is also possible to use contactors. The contactors can be of static or dynamic type, followed by decantation zones. It is also possible to use a membrane contactor wherein the gaseous effluents flow on one side of the membrane, the ionic liquid on the other side of the membrane and wherein material exchanges occur through the membrane.

By adapting zone ZA to the feed to be treated and by adjusting the contacting temperature and pressure, it is possible to achieve a selectivity to ensure capture of the solvent and possibly of the water by the ionic liquid while minimizing co-absorption of nitrogen.

The non-aqueous ionic liquid used in the present invention is selected from the group consisting of the liquid salts of general formula $Q^+A^-$ wherein $Q^+$ represents an ammonium, a phosphonium and/or a sulfonium and $A^-$ represents any anion, organic or inorganic, likely to form a liquid salt at low temperature, i.e. below 100° C. and advantageously at most 85° C., preferably below 50° C.

In the non-aqueous ionic liquid of formula $Q^+ A^-$, anions $A^-$ are preferably selected from the following anions: halogenides, nitrate, sulfate, phosphate, acetate, halogenoacetates, tetrafluoroborate, tetrachloroborate, hexafluorophosphate, hexafluoroantimonate, fluorosulfonate, alkylsulfonates (methylsulfonate for example), perfluoroalkylsulfonates (trifluoromethylsulfonate for example), bis (perfluoroalkylsulfonyl) amidides (bis-trifluoromethane-sulfonyl amidide of formula $N(CF_3SO_2)_2^-$ for example), tris-trifluoromethanesulfonyl methylide of formula $C(CF_3SO_2)_3^-$, arenesulfonates, possibly substituted by halogen or halogenoalkyl groups, as well as the tetraphenylborate anion and the tetraphenylborate anions whose aromatic rings are substituted.

Cations $Q^+$ are preferably selected from the group consisting of phosphonium, ammonium and/or sulfonium.

The ammonium and/or phosphonium cations $Q^+$ preferably have one of the following general formulas $[NR^1R^2R^3R^4]^+$ and $[PR^1R^2R^3R^4]^+$, or one of the general formulas $[R^1R^2N=CR^3R^4]^+$ and $[R^1R^2P=CR^3R^4]^+$ wherein $R^1, R^2, R^3$ and $R^4$, identical or different, represent each hydrogen (except for cation $NH_4^+$ for $[NR^1R^2R^3R^4]^+$), preferably a single substituent representing hydrogen, or hydrocarbyl remainders having 1 to 30 carbon atoms, for example alkyl groups, saturated or not, cycloalkyl or aromatic, aryl or aralkyl groups, possibly substituted, comprising 1 to 30 carbon atoms.

The ammonium and/or phosphonium cations can also be derived from nitrogen and/or phosphorus heterocycles comprising 1, 2 or 3 nitrogen and/or phosphorus atoms, of general formulas:

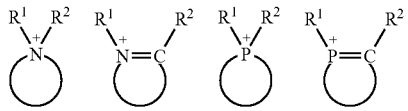

wherein the cycles consist of 4 to 10 atoms, preferably 5 to 6 atoms, $R^1$ and $R^2$ are defined as above.

The ammonium or phosphonium cation can also meet one of the following general formulas:

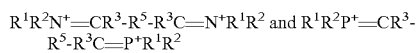

wherein $R^1$, $R^2$ and $R^3$, identical or different, are defined as above and $R^5$ represents an alkylene or phenylene remainder. Among groups $R^1$, $R^2$, $R^3$ and $R^4$, the following radicals can be mentioned: methyl, ethyl, propyl, isopropyl, secondary butyl, tertiary butyl, amyl, phenyl or benzyl; $R^5$ can be a methylene, ethylene, propylene or phenylene group.

The ammonium and/or phosphonium cation $Q^+$ is preferably selected from the group consisting of N-butylpyridinium, N-ethylpyridinium, pyridinium, ethyl-3-methyl-1-imidazolium, butyl-3-methyl-1-imidazolium, hexyl-3-methyl-1-imidazolium, butyl-3-dimethyl-1,2-imidazolium, diethyl-pyrazolium, N-butyl-N-methylpyrrolidinium, trimethylphenylammonium, tetrabutylphosphonium, tributyl-tetradecyl-phosphonium.

The sulfonium cations $Q^+$ can have the general formula $[SR^1R^2R^3]^+$, where $R^1$, $R^2$ and $R^3$, identical or different, represent each a hydrocarbyl remainder having 1 to 12 carbon atoms, for example an alkyl group, saturated or not, a cycloalkyl or aromatic, aryl, alkaryl or aralkyl group, comprising 1 to 12 carbon atoms.

Examples of salts that can be used according to the invention are N-butyl-pyridinium hexafluorophosphate, N-ethyl-pyridinium tetrafluoroborate, pyridinium fluorosulfonate, butyl-3-methyl-1-imidazolium tetrafluoroborate, butyl-3-methyl-1-imidazolium bis-trifluoromethane-sulfonyl amidide, triethylsulfonium bis-trifluoromethane-sulfonyl amidide, butyl-3-methyl-1-imidazolium hexafluoro-antimonate, butyl-3-methyl-1-imidazolium hexafluorophosphate, butyl-3-methyl-1-imidazolium trifluoroacetate, butyl-3-methyl-1-imidazolium trifluoromethylsulfonate, butyl-3-methyl-1-imidazolium bis(trifluoromethylsulfonyl)amidide, trimethylphenyl-ammonium hexafluorophosphate, tetrabutylphosphonium tetrafluoroborate. These salts can be used alone or in admixture.

The solvent absorption efficiency of the ionic liquid is all the higher as the molecules to be extracted have a high polarity or a high dielectric constant.

The ionic liquid circulating in line 16 is regenerated by separating the ionic liquid from the solvent and possibly from the water. Various techniques can be used to carry out this regeneration.

According to a first technique, the ionic liquid circulating in line 16 is regenerated by precipitating the ionic liquid by cooling and/or pressure decrease, then by separating the precipitated ionic liquid from the liquid solvent.

According to a second technique, the ionic liquid circulating in line 16 is regenerated by means of a technique commonly referred to as stripping. The solvent-laden ionic liquid is contacted with a fluid in such a way that the fluid carries the solvent along. For example, the solvent-laden ionic liquid is contacted with the fume before treatment. Thus, the fume carries the solvent and the solvent-depleted ionic liquid along.

According to a third technique illustrated by FIG. 1, the solvent absorbed by the ionic liquid circulating in line 16 is recovered by evaporation of the solvent. The solvent-laden ionic liquid can be expanded by expansion device V1 (expansion valve and/or turbine), possibly fed into a separator drum to release the constituents vaporized upon expansion, then it can be heated in heat exchanger E1. Finally, the ionic liquid is fed into evaporation device DE.

Device DE allows to separate the solvent from the ionic liquid. In device DE, the ionic liquid is heated by a reboiler to a sufficient temperature for vaporization of the solvent and possibly of the water. The ionic liquid can be fed into device DE so as to be contacted with the vaporized solvent and water. The thermodynamic conditions (pressure and temperature) of the evaporation have to be determined by the man skilled in the art according to economic considerations specific to each case. For example, evaporation can be carried out at a pressure ranging between 0.005 MPa and 3 MPa, and at the corresponding temperature for evaporation of the solvent. When the solvent is methanol, the evaporation temperature can range between 10° C. and 140° C. for a pressure ranging between 0.01 MPa and 1 MPa. The thermal stability of ionic liquids allows to operate within a wide temperature range. The vaporized solvent is discharged from device DE through line 14. The gas circulating in line 14 is condensed by cooling in heat exchanger E2, then fed into drum B1. The non-condensed compounds are discharged at the top of drum B1. The condensates collected at the bottom of drum B1 make up the solvent extracted from the purified fume circulating in line 9. Part of the condensates recovered at the bottom of drum B1 can be fed through line 15 into device DE as reflux. A second part of the condensates recovered at the bottom of drum B1 can be recycled. For example, this second part circulating in line 18 is pumped by pump P1, then fed through line 4 into column C1.

The regenerated ionic liquid, i.e. containing no or little solvent, is discharged in liquid form from device D2 through line 12. The regenerated ionic liquid can be cooled in heat exchanger E1, pumped by pump P2, then fed through line 13 into absorption zone ZA.

For example, device DE can be a distillation column having three to ten trays.

The pressure and temperature conditions under which evaporation is carried out in device DE can be selected so as to allow possible $H_2S$ or carbon dioxide traces co-absorbed by the ionic liquid in zone ZA to remain in the regenerated ionic liquid sent back to zone ZA.

The numerical example hereafter illustrates the method according to the invention described in connection with FIG. 1.

A flow of 500 000 $Nm^3/h$ of a combustion fume containing 12% $CO_2$ is decarbonated at −30° C. by means of a water-methanol solvent. The previously dehydrated, compressed and cooled fume is contacted in column C2 with a solvent containing 15% wt. water and 85% wt. methanol. The decarbonated fume is obtained at the top of column C2 at −30° C. and at 3 MPa. It circulates in line 9 at a flow rate of 440 000 $Nm^3/h$ and comprises 0.013% vol. methanol and less than 100 ppm water, most of the fume consisting then of 98.6% nitrogen and less than 1.2% $CO_2$. The proportion of $CO_2$ in the treated fume does however not interfere with the efficiency of the method according to the invention for recovery of the solvent carried along by the decarbonated fume, i.e. methanol and water in this example. The decarbonated fume is then heated to 45° C. in order to optimize gas-liquid contact in ZA.

Contacting the gas in ZA with an ionic liquid, 1-butyl-3-methylimidazolium bis(trifluoromethylsulfonyl)amidide [BMIM] [TF2N], allows to recover the methanol and the water contained in the decarbonated fume.

A flow rate of 60 $m^3/h$ ionic liquid in zone ZA allows to recover 95% of the methanol contained in the gas using a gas-liquid contactor with an efficiency equivalent to three theoretical stages. When a contactor achieving an efficiency equivalent to six theoretical stages is used, the methanol content of the treated gas is about 10 ppm mol.

A flow rate of 120 $m^3/h$ ionic liquid allows to obtain a treated gas containing about 10 ppm mol methanol using a contactor with an efficiency equivalent to four theoretical stages.

A fraction of the $CO_2$ present in the fume is co-absorbed in zone ZA. This carbon dioxide is recovered saturated with water and methanol during regeneration of the ionic liquid and discharged through line 19. This effluent is then recycled to the deacidizing loop of the process, at the level of column C2 or of zone R.

FIG. 2 shows an improvement brought to the method described in connection with FIG. 1. The reference numbers of FIG. 2 that are identical to those of FIG. 1 designate the same elements.

The purified gas circulating in line 9 notably comprises nitrogen, the non-absorbed carbon dioxide, solvent and possibly water. This gas is partly condensed by cooling in heat exchanger E3 for example to a temperature ranging between −40° C. and 0° C., then fed into separator drum B2. The condensates essentially comprising solvent are discharged from drum B2 through line 20. The gas phase obtained at the top of drum B2 is heated in heat exchanger E4, then fed into absorption zone ZA.

The improvement described in connection with FIG. 2 allows to extract by cooling part of the solvent contained in the effluent circulating in line 5 and consequently to reduce the flow rate of ionic liquid required to capture the solvent in zone ZA.

The invention claimed is:

1. A method of treating a combustion fume comprising nitrogen and at least one of the acid compounds as follows: carbon oxides, nitrogen oxides and sulfur oxides, wherein the following stages are carried out:
   a) contacting the fume with a solvent capturing the acid compounds so as to obtain, on the one hand, a solvent-comprising purified fume and, on the other hand, a solvent laden with acid compounds, and
   b) contacting the solvent-comprising purified fume obtained in stage a) with a non-aqueous ionic liquid so as to obtain a solvent-depleted purified fume and a solvent-laden ionic liquid, the ionic liquid having as general formula $Q^+A^-$; $Q^+$ designating an ammonium, phosphonium and/or sulfonium cation, and $A^-$ an anion likely to form a liquid salt.

2. A method as claimed in claim 1, wherein the following stage is also carried out:
   c) regenerating the solvent-laden ionic liquid so as to recover, on the one hand, a solvent-depleted ionic liquid and, on the other hand, a solvent-comprising effluent.

3. A method as claimed in claim 2 wherein, in stage c), the solvent-laden ionic liquid is heated to evaporate the solvent-comprising effluent.

4. A method as claimed in claim 2 wherein, prior to stage a), the fume is contacted with the solvent-comprising effluent obtained in stage c).

5. A method as claimed in claim 1, wherein the solvent laden with acid compounds obtained in stage a) is regenerated by expansion and/or by heating.

6. A method as claimed in claim 1, wherein prior to stage b), the purified fume obtained in stage a) is cooled in order to condense part of the solvent.

7. A method as claimed in claim 1, wherein the solvent comprises at least one compound selected from the group consisting of glycols, ethers, glycol ethers, alcohols, sulfolane, N-methylpyrrolidone, propylene carbonate, ionic liquids, amines, alkanolamines, amino-acids, amides, ureas, phosphates, carbonates, alkali metal borates, and water.

8. A method as claimed in claim 7, wherein the solvent contains water.

9. A method as claimed in claim 1, wherein anion $A^-$ is selected from the group consisting of the ions halogenides, nitrate, sulfate, phosphate, acetate, halogenoacetates, tetrafluoroborate, tetrachloroborate, hexafluoro-phosphate, hexafluoroantimonate, fluorosulfonate, alkylsulfonates, perfluoro-alkylsulfonates, bis(perfluoroalkylsulfonyl) amidides, tris-trifluoromethanesulfonyl methylide of formula $C(CF_3SO_2)_3^-$, alkylsulfates, arenesulfates, arenesulfonates, tetraphenylborate and tetraphenylborates whose aromatic rings are substituted.

10. A method as claimed in claim 1, wherein cation $Q^+$ has one of the following general formulas: $[NR^1R^2R^3R^4]^+$ excluding $NH_4^\pm$, $[PR^1R^2R^3R^4]^+$, $[R^1R^2N=CR^3R^4]^+$ and $[R^1R^2P=CR^3R^4]^+$ where $R^1$, $R^2$, $R^3$ and $R^4$ represent hydrogen or a hydrocarbyl having 1 to 30 carbon atoms.

11. A method as claimed in claim 1, wherein cation $Q^+$ is derived from a nitrogen and/or phosphorus heterocycle comprising 1, 2 or 3 nitrogen and/or phosphorus atoms, the heterocycle consisting of 4 to 10 carbon atoms.

12. A method as claimed in claim 1, wherein cation $Q^+$ has one of the general formulas as follows: $R^1R^2N^+=CR^3-R^5-$ $R^3C=N^+R^1R^2$ and $R^1R^2P^+=CR^3-R^5-R^3C=P^+R^1R^2$, where $R^1$, $R^2$ et $R^3$ represent hydrogen or a hydrocarbyl remainder having 1 to 30 carbon atoms and where $R^5$ represents an alkylene or phenylene remainder.

13. A method as claimed in claim 1, wherein cation $Q^+$ is selected from the group consisting of N-butylpyridinium, N-ethylpyridinium, pyridinium, ethyl-3-methyl-1-imidazolium, butyl-3-methyl-1-imidazolium, hexyl-3-methyl-1-imidazolium, butyl-3-dimethyl-1,2-imidazolium, diethyl-pyrazolium, N-butyl-N-methyl-pyrro-lidinium, trimethylphenylammonium, tetrabutylphosphonium, and tributyltetradecyl-phosphonium.

14. A method as claimed in claim 1, wherein cation $Q^+$ is of general formula $[SR^1R^2R^3]^+$, where $R^1$, $R^2$ and $R^3$ represent each a hydrocarbyl remainder having 1 to 12 carbon atoms.

15. A method as claimed in claim 1, wherein the ionic liquid is selected from the group consisting of N-butyl-pyridinium hexafluorophosphate, N-ethyl-pyridinium tetrafluoroborate, pyridinium fluorosulfonate, butyl-3-methyl-1-imidazolium tetrafluoroborate, butyl-3-methyl-1-imidazolium bis-trifluoromethane-sulfonyl amidide, triethylsulfonium bis-trifluoromethane-sulfonyl amidide, butyl-3-methyl-1-imidazolium hexafluoro-antimonate, butyl-3-methyl-1-imidazolium hexa-fluorophosphate, butyl-3-methyl-1-imidazolium trifluoroacetate, butyl-3-methyl-1-imidazolium trifluoromethylsulfonate, butyl-3-methyl-1-imidazolium bis(trifluoro-methylsulfonyl)amidide, trimethyl-phenylammonium hexafluorophosphate, and tetrabutylphosphonium tetrafluoroborate.

* * * * *